US009414253B2

(12) United States Patent
Jung et al.

(10) Patent No.: US 9,414,253 B2
(45) Date of Patent: *Aug. 9, 2016

(54) APPARATUS AND METHOD OF DISCARDING LOGGED MEASUREMENT IN WIRELESS COMMUNICATION SYSTEM

(71) Applicant: LG Electronics Inc., Seoul (KR)

(72) Inventors: Sung Hoon Jung, Anyang-si (KR); Sung Duck Chun, Anyang-si (KR); Seung June Yi, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/722,996

(22) Filed: May 27, 2015

(65) Prior Publication Data

US 2015/0281995 A1    Oct. 1, 2015

Related U.S. Application Data

(63) Continuation of application No. 14/484,864, filed on Sep. 12, 2014, now Pat. No. 9,072,004, which is a continuation of application No. 13/023,194, filed on Feb. 8, 2011, now Pat. No. 8,897,150.

(Continued)

(30) Foreign Application Priority Data

Jan. 31, 2011  (KR) .......................... 10-2011-0009701

(51) Int. Cl.
*H04L 12/26* (2006.01)
*H04W 24/10* (2009.01)
*H04W 76/04* (2009.01)

(52) U.S. Cl.
CPC ............ *H04W 24/10* (2013.01); *H04W 76/046* (2013.01)

(58) Field of Classification Search
None
See application file for complete search history.

(56) References Cited

U.S. PATENT DOCUMENTS

2002/0009168 A1*  1/2002  Dick .................... H04B 1/7073
375/356

(Continued)

FOREIGN PATENT DOCUMENTS

CN         1487754 A     4/2007
JP     2008-172380 A     7/2008

(Continued)

OTHER PUBLICATIONS

Sanya, P.R. China, Dec. 1-4, 2009, Nokia Siemens Networks, Nokia, New Work Item Proposal: Minimization of drive tests for E-UTRAN and UTRAN, 3GPP TSG RAN#46 RP-091418.

(Continued)

*Primary Examiner* — Kouroush Mohebbi
(74) *Attorney, Agent, or Firm* — Dentons US LLP

(57) ABSTRACT

A method of discarding logged measurements in a wireless communication system is provided. A user equipment in a Radio Resource Control (RRC) connected mode receives a Minimization of Drive Tests (MDT) configuration from a base station and starts a validity timer upon receiving the MDT configuration. The user equipment in an RRC idle mode logs measurements based on the MDT configuration to collect logged measurements while the validity timer is running. When the validity timer is expired, the user equipment discards the MDT configuration and starts a conservation timer. When the conservation timer is expired, the logged measurements are discarded.

20 Claims, 11 Drawing Sheets

Related U.S. Application Data

(60) Provisional application No. 61/302,927, filed on Feb. 9, 2010, provisional application No. 61/308,281, filed on Feb. 25, 2010, provisional application No. 61/325,363, filed on Apr. 18, 2010, provisional application No. 61/356,019, filed on Jun. 17, 2010.

(56) References Cited

U.S. PATENT DOCUMENTS

| | | | |
|---|---|---|---|
| 2004/0038681 A1* | 2/2004 | Chun | H04W 36/0072 455/436 |
| 2005/0042987 A1 | 2/2005 | Lee et al. | |
| 2009/0036116 A1 | 2/2009 | Kim et al. | |
| 2009/0103478 A1 | 4/2009 | Sammour et al. | |
| 2011/0195668 A1* | 8/2011 | Lee | H04W 24/10 455/67.11 |
| 2011/0287793 A1* | 11/2011 | Tenny | H04W 24/10 455/507 |
| 2013/0010631 A1* | 1/2013 | Jung | H04W 24/10 370/252 |
| 2013/0034013 A1* | 2/2013 | Jung | H04W 24/08 370/252 |
| 2013/0070632 A1* | 3/2013 | Jung | H04W 24/10 370/252 |
| 2013/0137379 A1* | 5/2013 | Jung | H04W 24/00 455/67.11 |

FOREIGN PATENT DOCUMENTS

| | | |
|---|---|---|
| KR | 10-2009-0016431 A | 2/2009 |
| KR | 10-2009-0000403 A | 7/2010 |
| RU | 2007120713 A | 2/2009 |
| WO | 2011083801 A1 | 7/2011 |
| WO | 2011157062 A1 | 12/2011 |

OTHER PUBLICATIONS

3GPP TR 36.805 (V2.0.0), "3rd Generation Partnership Project; Technical Specification Group Radio Access Network; Study on Minimization of drive-test in Next Generation Networks; (Release 9)", Dec. 31, 2009.

* cited by examiner

APPARATUS AND METHOD OF DISCARDING LOGGED MEASUREMENT IN WIRELESS COMMUNICATION SYSTEM

CROSS-REFERENCE TO RELATED APPLICATIONS

This application is a Continuation application of U.S. patent application Ser. No. 14/484,864, filed Sep. 12, 2014, now allowed, which is a continuation of U.S. application Ser. No. 13/023,194, filed Feb. 8, 2011, now U.S. Pat. No. 8,897,150, and claims the benefit of priority of U.S. Provisional applications 61/302,927 filed on Feb. 9, 2010, 61/308,281 filed on Feb. 25, 2010, 61/325,363 filed on Apr. 18, 2010, 61/356,019 filed on Jun. 17, 2010, and Korean Patent Application No. 10-2011-0009701 filed on Jan. 31, 2011, all of which are incorporated by reference in their entirety herein.

BACKGROUND OF THE INVENTION

1. Field of the Invention

The present invention relates to wireless communications, and more particularly, to a method and apparatus for discarding logged measurements in a wireless communication system.

2. Related Art

3rd generation partnership project (3GPP) long term evolution (LTE) is an improved version of a universal mobile telecommunication system (UMTS) and is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

Minimization of driving tests (MDT) is a test performed by service providers for coverage optimization by using a user equipment (UE) instead of using an automobile. A coverage varies depending on a location of a base station (BS), deployment of buildings nearby, a user's usage environment, etc. Therefore, it is required for the service providers to periodically perform the driving test, and a lot of costs and resources are consumed. The MDT is used when the service provider measures the coverage by using the UE.

The MDT can be classified into a—logged MDT and an immediate MDT. According to the logged MDT, after performing the MDT measurement, the UE delivers a logged measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in a radio resource control (RRC) idle mode, but the immediate MDT performs the MDT measurement in an RRC connected mode.

The logged measurement is a result of the logged MDT measurement, and can be considered as data which is practically unnecessary to the UE. Accordingly, there is a need for a method capable of discarding the logged measurement without having an effect on an available memory and service quality but with utilizing previously stored logged measurements.

SUMMARY OF THE INVENTION

The present invention provides a method and apparatus for discarding logged measurements in a wireless communication system.

In an aspect, a method of discarding logged measurements of a user equipment in a wireless communication system is provided. The method includes receiving, by a user equipment in a Radio Resource Control (RRC) connected mode from a base station, a Minimization of Drive Tests (MDT) configuration, upon receiving the MDT configuration, starting a validity timer, logging, by the user equipment in an RRC idle mode, measurements based on the MDT configuration to collect logged measurements while the validity timer is running, when the validity timer is expired, discarding the MDT configuration and starting a conservation timer, and when the conservation timer is expired, discarding the logged measurements.

A value of the conservation timer may be fixed.

The value of the conservation timer may be 48 hours.

The MDT configuration may include a value for the validity timer.

The MDT configuration may include a logging interval indicating periodicity for storing measurement results.

The method may further include stopping to log the measurements and keeping the logged measurements when the validity timer is expired.

The method may further include transmitting, by the user equipment to the base station, a logging indicator indicating an availability of the logged measurements while the conservation timer is running.

The method may further include receiving, by the user equipment from the base station, an information request to request the logged measurements, and transmitting, by the user equipment to the base station, an information response to send the logged measurements.

The logged measurements may include measurement results of at least one serving cell and time information.

In another aspect, an apparatus of discarding logged measurements in a wireless communication system is provided. The apparatus includes a radio frequency unit for transmitting and receiving radio signals, and a processor operatively coupled with the radio frequency unit and configured for receiving, from a base station, a Minimization of Drive Tests (MDT) configuration, upon receiving the MDT configuration, starting a validity timer, logging measurements based on the MDT configuration to collect logged measurements while the validity timer is running, when the validity timer is expired, discarding the MDT configuration and starting a conservation timer, and when the conservation timer is expired, discarding the logged measurements.

A minimization of driving tests (MDT) configuration and an MDT measurement are discarded in two steps so that a user equipment can be prevent from persistently and indefinitely performing the MDT measurement in a network not supporting MDT and a chance to report a pre-measurement result can be ensured. Therefore, battery consumption of the user equipment can be reduced in the MDT measurement, and a memory of the user equipment can be more effectively used.

DESCRIPTION OF EXEMPLARY EMBODIMENTS

Figure 1:
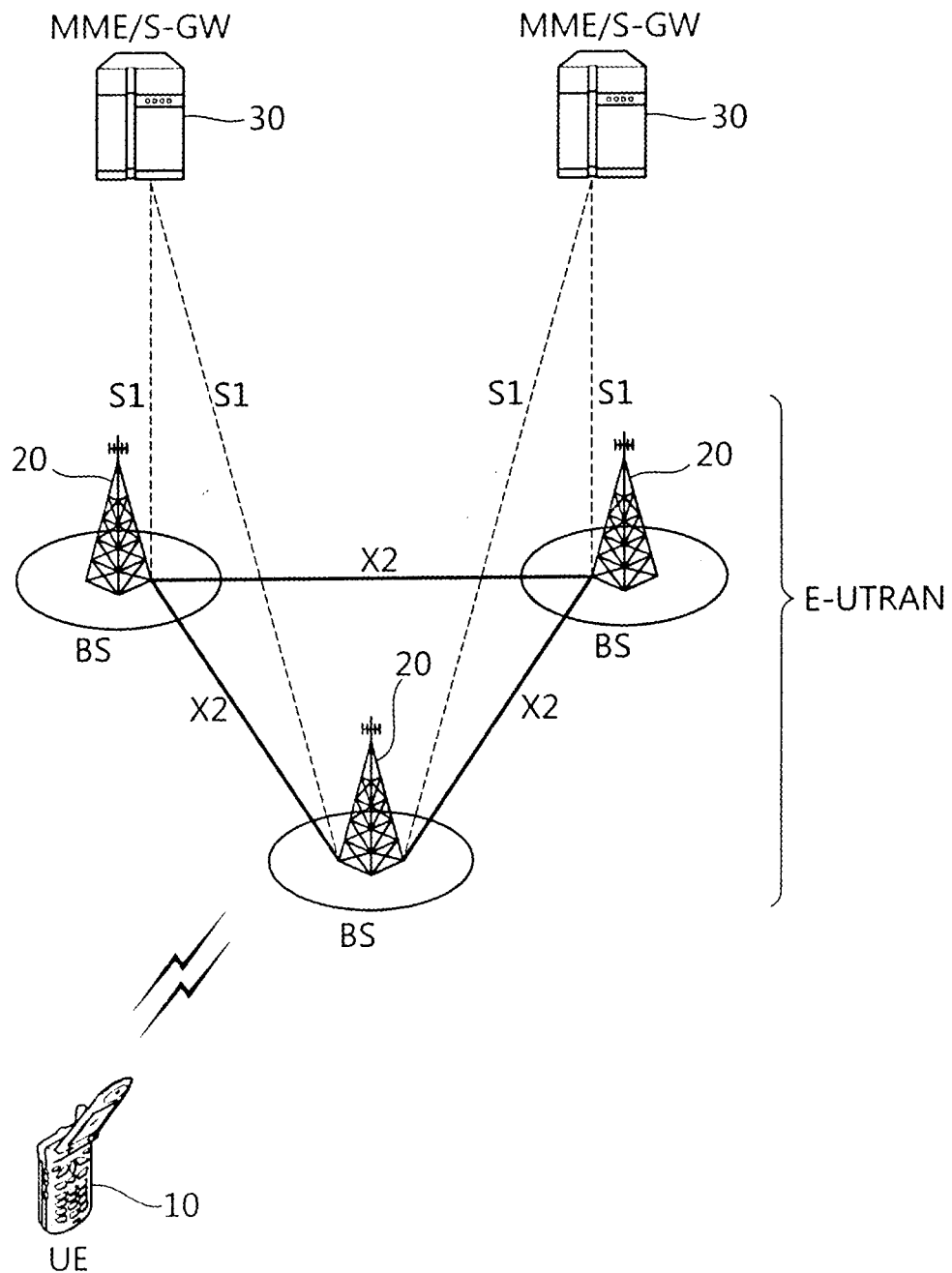
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
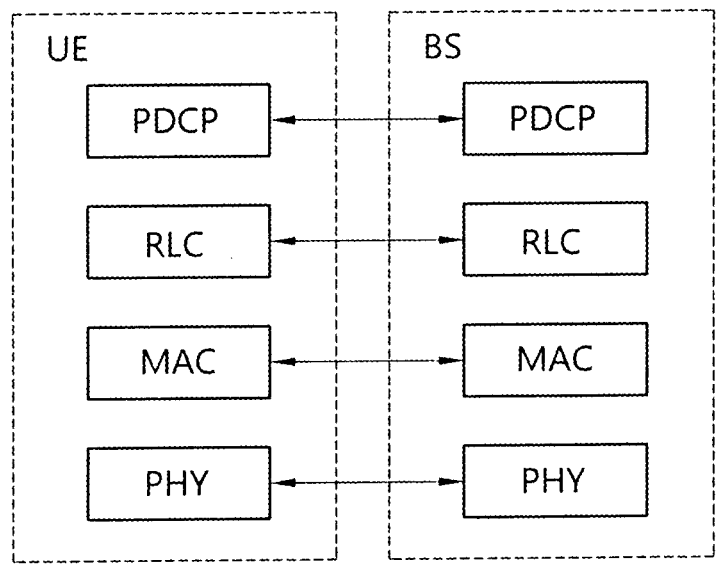
FIG. 2 is a diagram showing a radio protocol architecture for a user plane.
Figure 3:
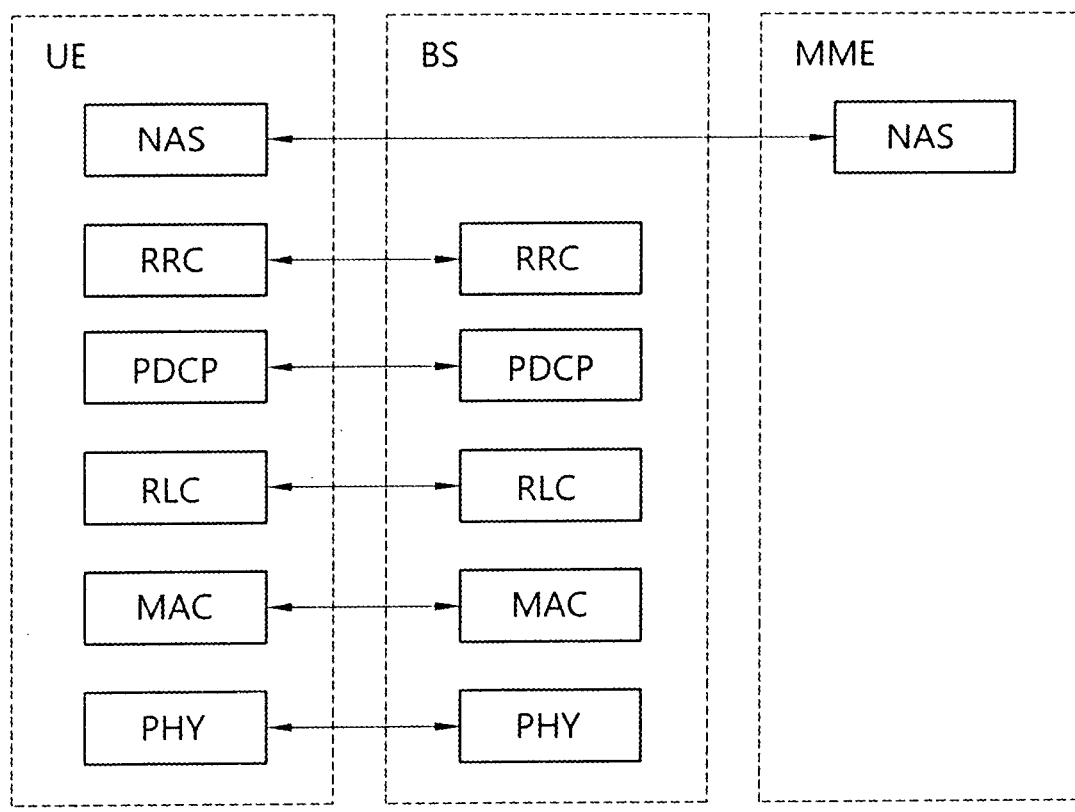
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/demultiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Hereinafter, an RRC state of a UE and an RRC connection mechanism will be described.

The RRC state indicates whether an RRC layer of the UE is logically connected to an RRC layer of an E-UTRAN. If the two layers are connected to each other, it is called an RRC connected state, and if the two layers are not connected to each other, it is called an RRC idle state. When in the RRC connected state, the UE has an RRC connection and thus the E-UTRAN can recognize a presence of the UE in a cell unit. Accordingly, the UE can be effectively controlled. On the other hand, when in the RRC idle state, the UE cannot be recognized by the E-UTRAN, and is managed by a core network in a tracking area unit which is a unit of a wider area than a cell. That is, regarding the UE in the RRC idle state, only a presence or absence of the UE is recognized in a wide area unit. To get a typical mobile communication service such as voice or data, a transition to the RRC connected state is necessary.

When a user initially powers on the UE, the UE first searches for a proper cell and thereafter stays in the RRC idle state in the cell. Only when there is a need to establish an RRC connection, the UE staying in the RRC idle state establishes the RRC connection with the E-UTRAN through an RRC connection procedure and then transitions to the RRC connected state. Examples of a case where the UE in the RRC idle state needs to establish the RRC connection are various, such as a case where uplink data transmission is necessary due to telephony attempt of the user or the like or a case where a response message is transmitted in response to a paging message received from the E-UTRAN.

A non-access stratum (NAS) layer belongs to an upper layer of the RRC layer and serves to perform session management, mobility management, or the like.

To manage mobility of the UE in the NAS layer, two states are defined, i.e., an EPS mobility management-REGISTERED (EMM-REGISTERED) state and an EMM-DEREGISTERED state. These two states apply to the UE and the MME. Initially, the UE is in the EMM-DEREGISTERED state. To access a network, the UE performs a process of registering to the network through an initial attach procedure. If the attach procedure is successfully performed, the UE and the MME enter the EMM-REGISTERED state.

To manage a signaling connection between the UE and the EPC, two states are defined, i.e., an EPS connection management (ECM)-IDLE state and an ECM-CONNECTED state. These two states apply to the UE and the MME. When the UE in the ECM-IDLE state establishes an RRC connection with the E-UTRAN, the UE enters the ECM-CONNECTED state. When the MME in the ECM-IDLE state establishes an S1 connection with the E-UTRAN, the MME enters the ECM-CONNECTED state. When the UE is in the ECM-IDLE state, the E-UTRAN does not have context information of the UE. Therefore, the UE in the ECM-IDLE state performs a UE-based mobility related procedure such as cell selection or reselection without having to receive a command of the network. On the other hand, when the UE is in the ECM-CONNECTED state, mobility of the UE is managed by the command of the network. If a location of the UE in the ECM-IDLE state becomes different from a location known to the network, the UE reports the location of the UE to the network through a tracking area update procedure.

Next, system information will be described.

The system information includes essential information that must be known to a UE to access a BS. Thus, the UE has to receive all of the system information before accessing the BS. Further, the UE must always have the latest system information. Since the system information is information that must be known to all UEs in one cell, the BS periodically transmits the system information.

According to the section 5.2.2 of 3GPP TS 36.331 V8.4.0 (2008-12) "Radio Resource Control (RRC); Protocol specification (Release 8)", the system information is classified into a master information block (MIB), a scheduled block (SB), and a system information block (SIB). The MIB allows the UE to know a physical configuration (e.g., bandwidth) of a particular cell. The SB reports transmission information (e.g., a transmission period or the like) of SIBs. The SIB is a group of a plurality of pieces of system information related to each other. For example, an SIB includes only information of a neighbor cell, and another SIB includes only information of an uplink radio channel used by the UE.

In general, a service provided by the network to the UE can be classified into three types to be described below. Further, according to which service can be provided, the UE recognizes a cell type differently. A service type will be first described below, and then the cell type will be described.

1) Limited service: This service provides an emergency call and an earthquake and tsunami warning system (ETWS), and can be provided in an acceptable cell.

2) Normal service: This service denotes a public use service for general use, and can be provided in a suitable or normal cell.

3) Operator service: This service denotes a service for a network service provider, and a cell can be used only by the network service provider and cannot be used by a normal user.

The service type provided by a cell can be classified as follows.

1) Acceptable cell: This cell serves a UE with a limited service. This cell is not barred from the perspective of the UE, and satisfies a cell selection criterion of the UE.

2) Suitable cell: This cell serves a UE with a regular service. This cell satisfies a condition of the acceptable cell, and also satisfies additional conditions. Regarding the additional conditions, this cell has to belong to a PLMN to which the UE can access, and a tracking area update procedure of the UE must not be barred in this cell. If the corresponding cell is a CSG cell, this cell must be accessible by the UE as a CSG member.

3) Barred cell: Information indicating that a cell is a barred cell is broadcast in this cell by using the system information.

4) Reserved cell: Information indicating that a cell is a reserved cell is broadcast in this cell by using the system information.

Figure 4:
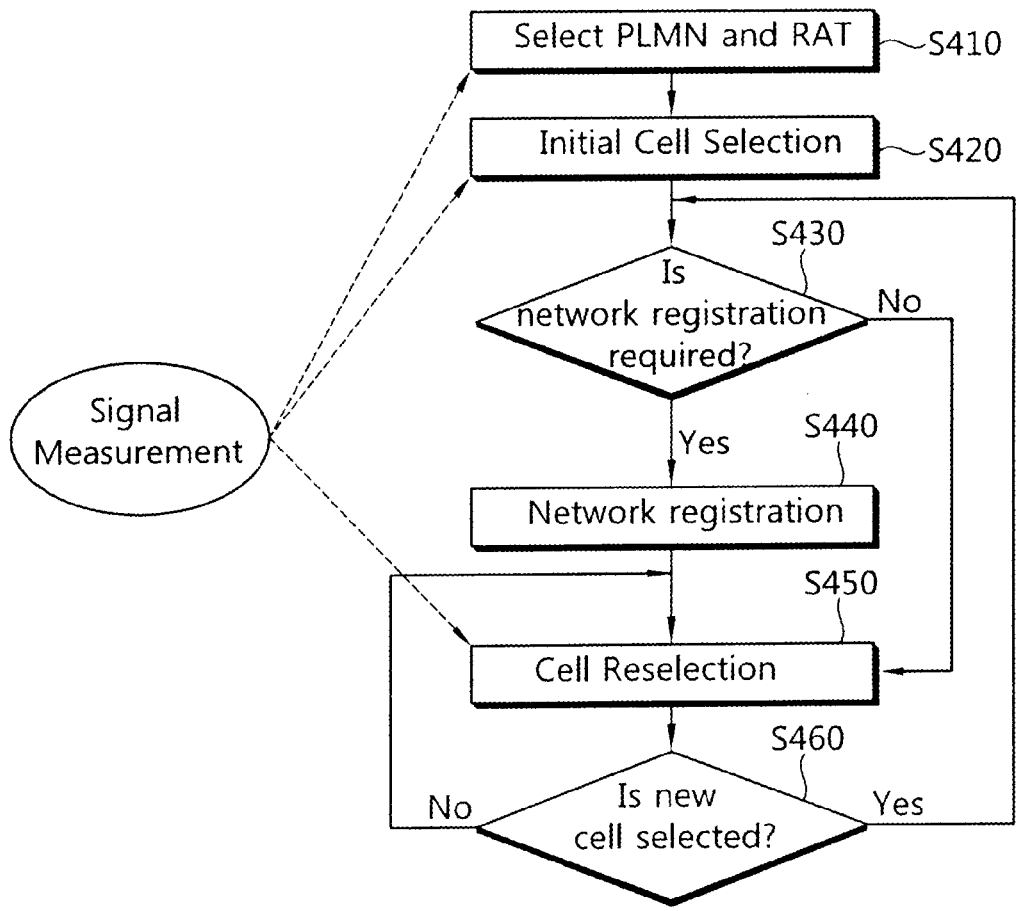
FIG. 4 is a flowchart showing a cell selection procedure of a user equipment (UE) in an idle mode.

FIG. 4 is a flowchart showing a cell selection procedure of a UE in an idle mode.

The UE selects a public land mobile network (PLMN) and a radio access technology (RAT) to receive a service (step S410). The PLMN and the RAT may be selected by a user of the UE, and data stored in a universal subscriber identity module (USIM) may also be used.

Among cells of which signal strength or quality measured from a BS is greater than a particular value, the UE selects a cell having a greatest value (step S420). Then, the UE receives system information periodically sent by the BS. The particular value is a value defined in a system to guarantee quality of a physical signal in data transmission/reception. Accordingly, the value may vary depending on the RAT in use.

If network registration is required, the UE registers its own information (for example, IMSI) for receiving a service (for example, paging) from a network (steps S430 and S440). The network registration is not performed whenever the UE selects a cell. For example, the network registration is performed when system information (for example, Tracking Area Identity (TAI)) of the network to be registered is different from network information known to the UE.

If a value of the signal strength or quality measured from the BS which provides a service to the UE is less than a value measured from a BS in a neighboring cell, the UE selects one of other cells providing a better signal property than that of a cell of the BS currently accessed by the UE (step S450). This process is referred to as cell reselection to distinguish it from initial cell selection of the step S420. In this case, the cell reselection may occur frequently according to changes in the signal property, and to prevent this, time constraints may be given.

Next, a procedure for selecting a cell by the UE will be described in detail.

If the UE is turned on or is camped on a cell, the UE may perform procedures for selecting/reselecting a cell having suitable quality in order to receive a service.

The UE in an RRC idle state needs to select the cell having suitable quality all the time, and thus be prepared to receive the service through the cell. For example, the UE that has been just turned on must select the cell having suitable quality so as to be registered into a network. If the UE that has stayed in an RRC connected state enters into an RRC idle state, the UE must select a cell on which the UE itself is camped. In this manner, a process of selecting a cell satisfying a certain condition by the UE in order to stay in a service waiting state such as the RRC idle state is called cell selection. The cell selection is performed in a state that the UE does not currently determine a cell on which the UE itself is camped in the RRC idle state, and thus it is very important to select the cell as quickly as possible. Therefore, if a cell provides radio signal quality greater than or equal to a predetermined level, the cell may be selected in the cell selection process of the UE even though the cell is not a cell providing best radio signal quality.

Hereinafter, by referring to the 3GPP TS 36.304 V8.3.0 (2008-09) "User Equipment (UE) procedures in idle mode (Release 8)", a method and procedure for selecting a cell by a UE will be described in detail.

If power is initially turned on, the UE searches for available PLMNs and selects a suitable PLMN to receive a service. Subsequently, the UE selects a cell having a signal quality and property capable of receiving a suitable service among the cells provided by the selected PLMN.

The cell selection process can be classified into two processes.

One process is an initial cell selection process, and in this process, the UE does not have previous information on radio channels. Therefore, the UE searches for all radio channels to find a suitable cell. In each channel, the UE searches for the strongest cell. Subsequently, if a suitable cell satisfying cell selection criteria is found, the UE selects the cell.

The other process is a cell selection process using stored information, and in this process, the UE uses radio channel information stored in the UE, or selects a cell by using information being broadcasted from the cell. Accordingly, a cell may be quickly selected compared to the initial cell selection process. If a cell satisfying the cell selection criteria is found, the UE selects the cell. If the cell satisfying the cell selection criteria is not found, the UE performs the initial cell selection process.

The cell selection criteria used by the UE in the cell selection process may be represented by Equation 1 as shown:

$$Srxlev > 0 \qquad \text{[Equation 1]}$$

where $Srxlev = Qrxlevmeas - (Qrxlevmin + Qrxlevminoffset) - Pcompensation$. Qrxlevmeas denotes a measured cell received level (i.e., reference signal received power (RSRP)), Qrxlevmin denotes a minimum required received level (dBm) in the cell, Qrxlevminoffset denotes a offset to Qrxlevmin, Pcompensation is $max(PEMAX - PUMAX, 0)$ (dB), PEMAX denotes maximum transmission power (dBm) allowed for the UE in the corresponding cell, and PUMAX denotes maximum transmission power (dBm) for a radio frequency (RF) transmission unit of the UE and based on performance of the UE.

In the above Equation 1, it can be seen that the UE selects a cell having signal strength and quality greater than a particular value specified in the cell providing the service. Further, the parameters used in the above Equation 1 are broadcast by using the system information, and the UE receives those parameter values to use them for the cell selection criteria.

If the UE selects a cell satisfying the cell selection criteria, the UE receives information required for an RRC idle mode operation of the UE in the corresponding cell from the system information of the corresponding cell. The UE receives all the information required for the RRC idle mode operation, and then waits in an idle mode to request a service (for example, originating call) to a network or receive a service (for example, terminating call) from the network.

After the UE selects a certain cell through a cell selection process, the signal strength and quality between the UE and the BS may be changed due to the change of the UE mobility and wireless environment. Therefore, if the quality of the selected cell deteriorates, the UE may select another cell providing better quality. If a cell is reselected in this manner, a cell providing signal quality better than that of the currently selected cell is selected in general. This process is called cell reselection. A basic object of the cell reselection process is generally to select a cell providing best quality to the UE from the perspective of the radio signal quality.

In addition to the perspective of the radio signal quality, the network may notify the UE of a priority determined for each frequency. The UE that has received the priority may consider this priority in the first place than the radio signal quality criteria during the cell reselection process.

As described above, there is a method of selecting or reselecting a cell based on the signal property of the wireless environment. When a cell is selected for reselection in the cell reselection process, there may be cell reselection methods as described below, based on the RAT and frequency characteristics of the cell.

Intra-frequency cell reselection: A reselected cell is a cell having the same center-frequency and the same RAT as those used in a cell on which the UE is currently being camped.

Inter-frequency cell reselection: A reselected cell is a cell having the same RAT and a different center-frequency with respect to those used in the cell on which the UE is currently being camped.

Inter-RAT cell reselection: A reselected cell is a cell using a different RAT from a RAT used in the cell on which the UE is currently being camped.

The principles of the cell reselection process are as follows.

First, the UE measures quality of a serving cell and a neighboring cell for cell reselection.

Second, the cell reselection is performed based on cell reselection criteria. The cell reselection criteria have following characteristics with regard to the measurement of serving cells and neighboring cells.

The intra-frequency cell reselection is basically based on ranking. The ranking is an operation for defining a criterion value for evaluation of cell reselection and for ordering cells according to a magnitude of the criterion value by using the criterion value. A cell having the highest criterion is referred to as a best-ranked cell. The cell criterion value is a value to which a frequency offset or a cell offset is optionally applied on the basis of a value measured by the UE for a corresponding cell.

The inter-frequency cell reselection is based on a frequency priority provided by the network. The UE attempts to camp on at a frequency having a top priority. The network may provide the same frequency priority to be commonly applied to UEs in a cell by using broadcast signaling or may provide a frequency-specific priority to each UE by using dedicated signaling for each UE.

For the inter-frequency cell reselection, the network may provide parameters (e.g., frequency-specific offsets) for use in cell reselection to the UE for each frequency.

For the intra-frequency cell reselection or the inter-frequency cell reselection, the network may provide a neighboring cell list (NCL) for use in the cell reselection to the UE. The NCL includes cell-specific parameters (e.g. cell-specific offsets) used in the cell reselection.

For the intra-frequency or inter-frequency cell reselection, the network may provide the UE with a black list, i.e., a list of cells not to be selected in the cell reselection. The UE does not perform the cell reselection on cells included in the black list.

Now, the ranking used in a cell reselection evaluation process will be described.

A ranking criterion used to assign a priority to a cell is defined by Equation 2 as shown:

$$Rs = Q_{meas,s} + Q_{hyst}, Rn = Q_{meas,n} - Q_{offset}$$ [Equation 2]

where Rs denotes a ranking value of a serving cell, Rn denotes a ranking criterion of a neighboring cell, $Q_{meas,s}$ denotes a quality value measured for the serving cell by the UE, $Q_{meas,n}$ denotes a quality value measured for the neighboring cell by the UE, Qhyst denotes a hysteresis value for ranking, and Qoffset denotes an offset between two cells.

In the intra-frequency cell reselection, if the UE receives an offset Qoffsets,n between the serving cell and the neighboring cell, Qoffset=Qoffsets,n. Otherwise, Qoffset=0.

In the inter-frequency cell reselection, if the UE receives the offset Qoffsets,n, Qoffset=Qoffsets,n+Qfrequency. Otherwise, Qoffset=Qfrequency.

If the ranking criterion Rs of the serving cell and the ranking criterion Rn of the neighboring cell are not much different from each other and constantly vary, ranking orders of the serving cell and the neighboring cell may change frequently. Thus, the serving cell and the neighboring cell may be reselected alternately while changing their ranking orders too often. In order to prevent the UE from reselecting two cells alternately, the hysteresis value Qhyst is used to give a hysteresis in the cell reselection.

The UE measures the ranking criterion Rs of the serving cell and the ranking criterion Rn of the neighboring cell according to the above equation. A cell having the greatest ranking criterion value is reselected by considering this cell as a best-ranked cell.

In the above-mentioned cell reselection criterion, the quality of cells is considered as most important factor when performing the cell reselection. If a reselected cell is not a suitable cell, the UE excludes the reselected cell or a frequency of the reselected cell from targets of the cell reselection.

Figure 5:
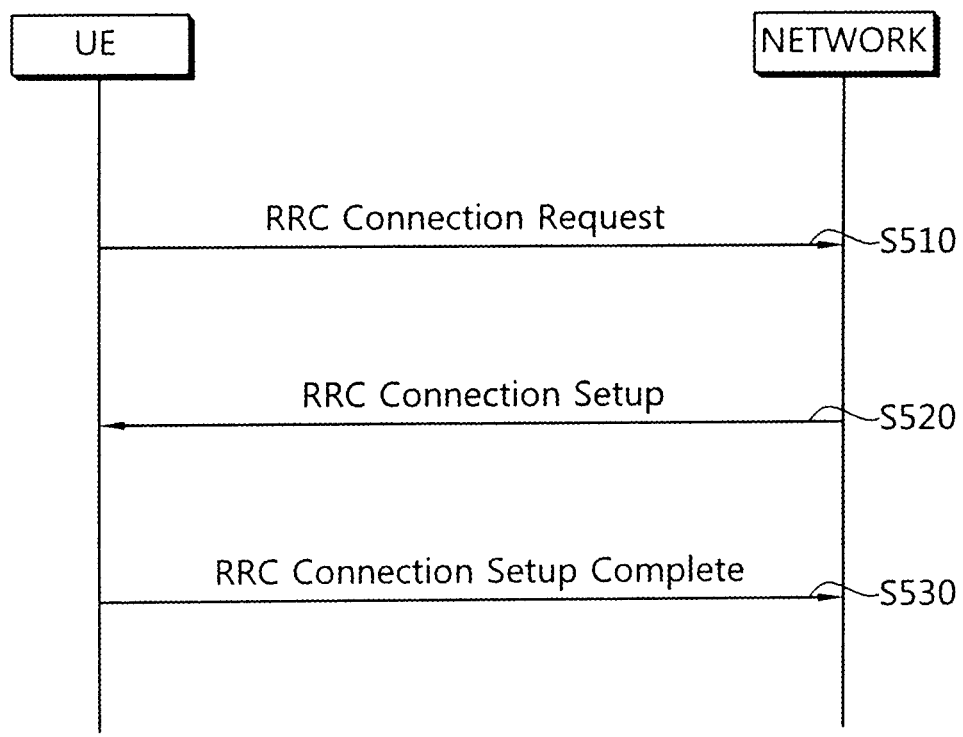
FIG. 5 is a flowchart showing an RRC connection establishment procedure.

FIG. 5 is a flowchart showing an RRC connection establishment procedure.

A UE sends to a network an RRC connection request message for requesting an RRC connection (step S510). The network sends an RRC connection setup message in response to the RRC connection request (step S520). After receiving the RRC connection setup message, the UE enters an RRC connected mode.

The UE sends to the network an RRC connection setup complete message used to confirm successful completion of the RRC connection establishment (step S530).

An RRC connection reestablishment is similarly performed as the RRC connection establishment. The RRC connection establishment is to re-establish the RRC connection, which involves the resumption of SRB1 operation, the re-activation of security and the configuration of only the primary cell. A UE sends to a network an RRC connection reestablishment request message for requesting an RRC connection establishment. The network sends an RRC connection reestablishment message in response to the RRC connection reestablishment request. The UE sends to the network an RRC connection reestablishment complete message as a response for the RRC connection reestablishment.

Figure 6:
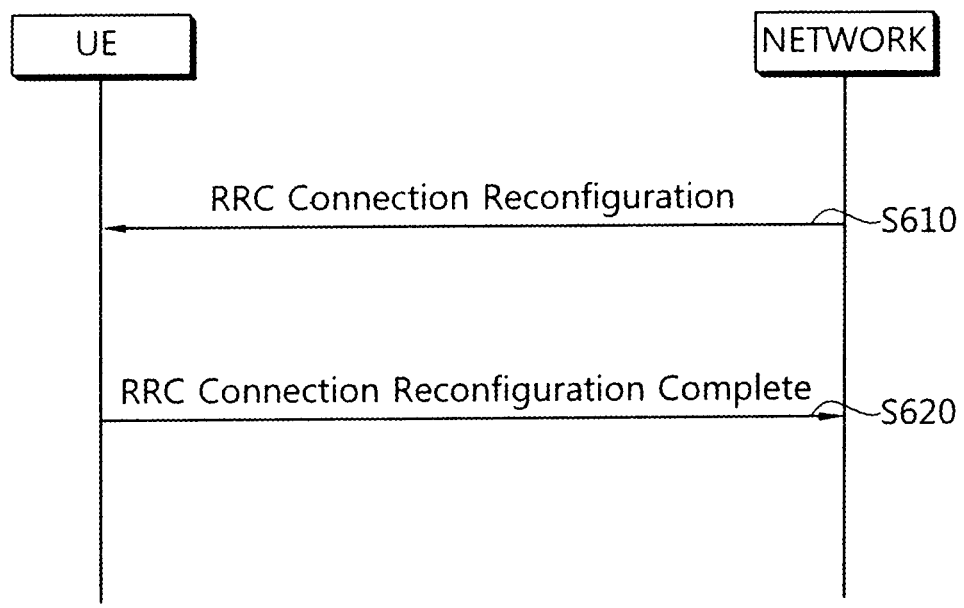
FIG. 6 is a flowchart showing an RRC connection reconfiguration procedure.

FIG. 6 is a flowchart showing an RRC connection reconfiguration procedure. An RRC connection reconfiguration is used to modify an RRC connection. This is used to establish/modify/release an RB, to perform a handover, to setup/modify/release measurements, and to add/modify/release secondary cells.

A network sends to a UE an RRC connection reconfiguration message for modifying the RRC connection (step S610). In response to the RRC connection reconfiguration, the UE sends to the network an RRC connection reconfiguration complete message used to confirm successful completion of the RRC connection reconfiguration (step S620).

Figure 7:
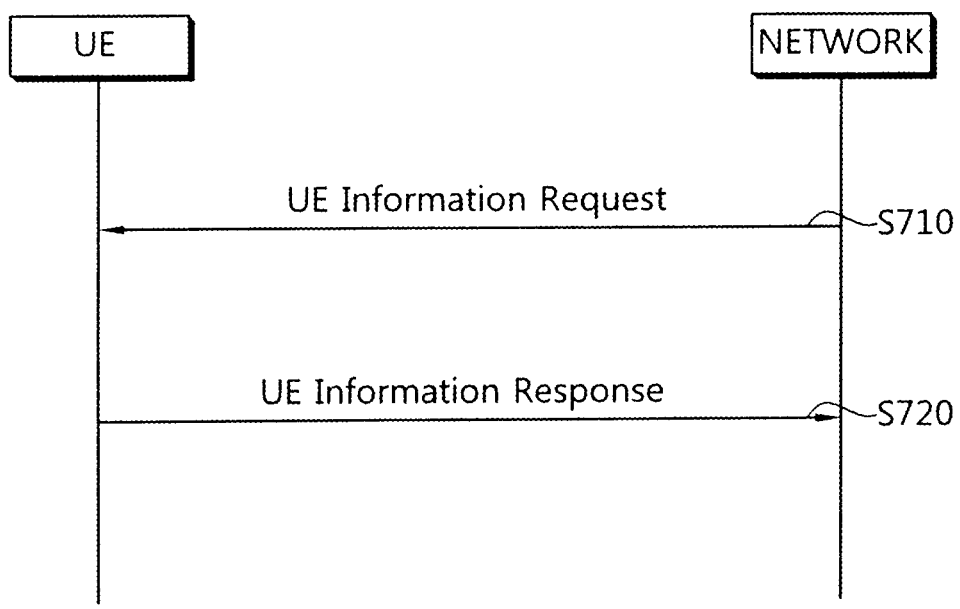
FIG. 7 is a flowchart showing a UE information reporting procedure.

FIG. 7 is a flowchart showing a UE information reporting procedure.

A network sends to a UE a UE information request message for obtaining UE information (step S710). The UE information request message includes a field for indicating whether the UE will report information on a random access process and/or a radio link failure. The UE information request message includes a field for indicating whether the UE will report a logged measurement.

The UE sends to the network a UE information response message including information requested by the UE information request (step S720).

Now, minimization of driving tests (MDT) will be described.

The MDT is a test performed by service providers for coverage optimization by using a UE instead of using an automobile. A coverage varies depending on a location of a BS, deployment of buildings nearby, a user's usage environment, etc. Therefore, it is required for the service providers to periodically perform driving tests, and a lot of costs and resources are consumed. The MDT is used when the service provider measures the coverage by using the UE.

The MDT can be classified into a logged MDT and an immediate MDT. According to the logged MDT, after performing the MDT measurement, the UE delivers a logged measurement to a network available at a time of satisfying a reporting condition. According to the immediate MDT, after performing the MDT measurement, the UE delivers the measurement to the network at points in time when a configured reporting condition is satisfied. The logged MDT performs the MDT measurement in an RRC idle mode, but the immediate MDT performs the MDT measurement in an RRC connected mode.

Figure 8:
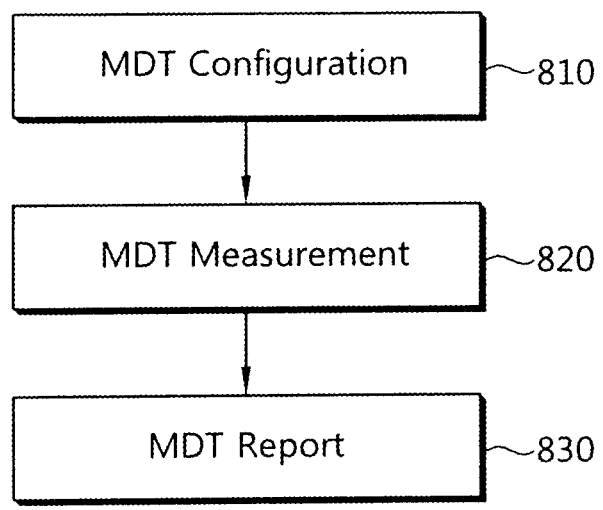
FIG. 8 shows a procedure of performing MDT.

FIG. 8 shows a procedure of performing MDT.

The MDT includes an MDT configuration 810, an MDT measurement 820, and an MDT report 830 which are performed in that order.

The MDT configuration can be transmitted from a network to a UE via a logged measurement configuration message which is an RRC message. The UE can receive the MDT configuration in an RRC connected mode. Even if the UE transitions to an RRC idle mode, the MDT configuration is kept, and thus an MDT measurement result is also kept.

The MDT configuration may include at least one of a logging interval, a reference time, and an area configuration. The logging interval indicates a periodicity for storing a measurement result. The reference time is used by the UE to echo back the reference in a logged measurement report. The area configuration indicates an area for which the UE is requested to perform logging.

The UE performs the MDT measurement based on the MDT configuration. For example, the MDT measurement is performed at every logging interval.

A measurement value may be a value well-known to those ordinary skilled in the art, such as reference signal received power (RSRP), reference signal received quality (RSRQ), received signal code power (RSCP), and Ec/No.

The UE sends to the network a logged measurement in the RRC connected mode. In the logged MDT, the UE logs the measurement in the RRC idle mode. Then, upon re-entering the RRC connected mode, the UE sends the logged measurement to the network.

The logged measurement may include at least one of measurement results of available serving cell measurements, measurement results of available neighbor cell measurements, time information, and location information.

For the MDT report, the UE information reporting procedure of FIG. 7 can be used. The network sends to the UE an information request including a field that indicates a report of the logged measurement. The UE sends to the network an information response including the logged measurement.

The logged measurement is a result of the MDT measurement, and can be considered as data which is unnecessary to the UE. When the serving cell does not support the MDT or the network is overloaded, the UE keeps the logged measurement in a memory for a long period of time. The logged measurement may have an effect on memory management of the UE.

Figure 9:
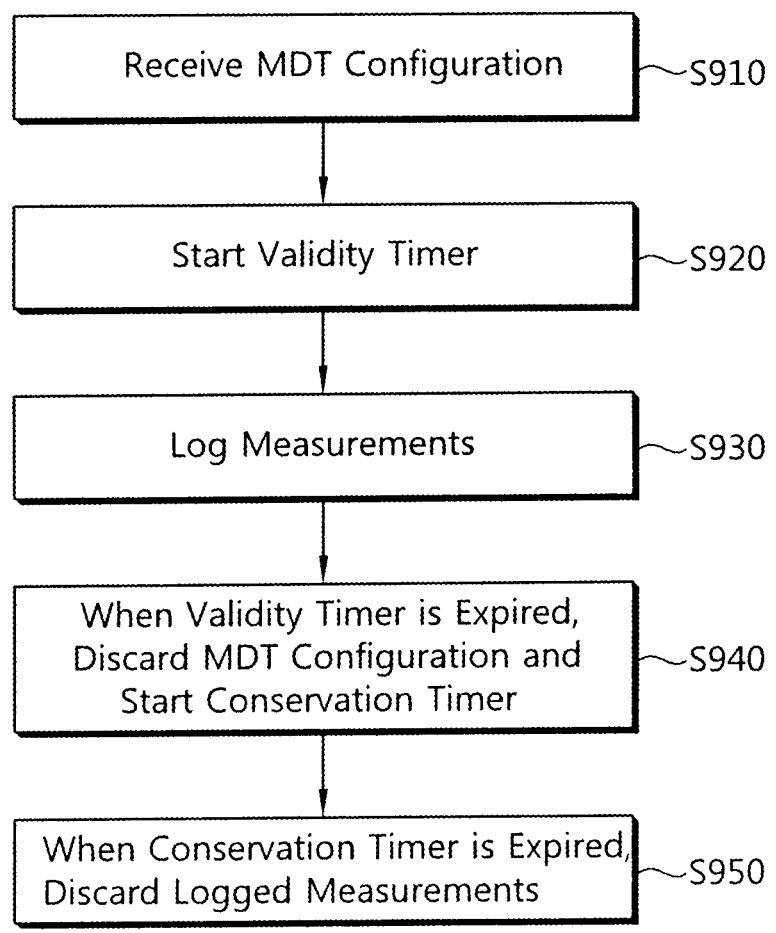
FIG. 9 is a flowchart showing a method of discarding a logged measurement according to an embodiment of the present invention.

FIG. 9 is a flowchart showing a method of discarding a logged measurement according to an embodiment of the present invention.

A UE receives an MDT configuration from a network (step S910). The UE is in an RRC connected mode in which an RRC connection is established to a serving cell. The MDT configuration may include at least one of a logging interval, a reference time, and an area configuration.

Upon receiving the MDT configuration, the UE starts a validity timer (step S920). The validity timer indicates a lifetime of the MDT configuration. The value of the validity timer may be included in the MDT configuration. This value is referred to as a logging duration. When the UE receives the MDT configuration, the UE sets the value of the validity timer to the logging duration, and starts the validity timer.

The UE transitions to an RRC idle mode, and logs measurements on the basis of the MDT configuration while the validity timer is running (step S930).

At the expiry of the validity timer, the UE discards the MDT configuration, and starts a conservation timer (step S940). The UE removes the MDT configuration and stops the MDT measurement. However, the logged measurement is kept. The conservation timer indicates a lifetime of the logged measurement.

At the expiry of the conservation timer, the logged measurement is discarded (step S950). When a request of reporting the logged measurement is received from a BS while the conservation timer is running, the UE may report the logged measurement.

The conservation timer may have a fixed value. For example, the value of the conservation timer may be 48 hours. Alternatively, the value of the conservation timer may be included in the MDT configuration and may be reported by the BS to the UE.

Upon receiving a new MDT configuration, the previous MDT configuration is updated to the new MDT configuration, and the validity timer restarts. In addition, the logged MDT measurement is discarded according to the previously determined MDT configuration.

After the MDT configuration is discarded, the logged measurement is kept until the conservation timer is expired. The MDT configuration and the logged measurement are sequentially discarded in two steps. By discarding the MDT configuration, battery consumption caused by the MDT measurement is reduced. The logged measurement may be kept after stopping the MDT measurement, so that the network can ensure a chance to receive the logged measurement.

Figure 10:
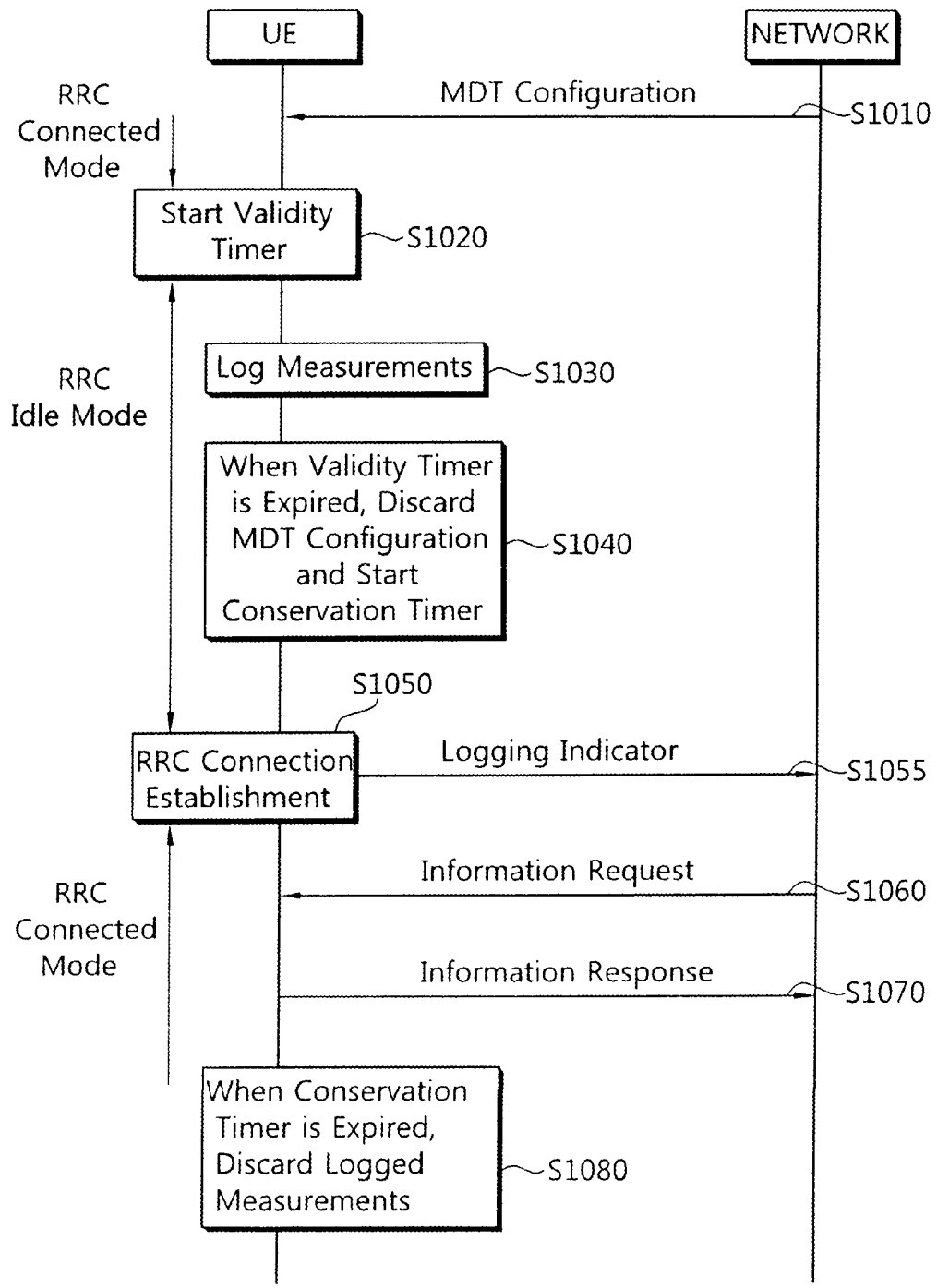
FIG. 10 is a flowchart showing a method of discarding and reporting a logged measurement according to an embodiment of the present invention.

FIG. 10 is a flowchart showing a method of discarding and reporting a logged measurement according to an embodiment of the present invention.

A UE receives an MDT configuration from a network (step S1010). The UE is in an RRC connected mode in which an RRC connection is established to a serving cell.

Upon receiving the MDT configuration, the UE starts a validity timer (step S1020).

The UE transitions to an RRC idle mode, and logs measurements on the basis of the MDT configuration while the validity timer is running (step S1030).

At the expiry of the validity timer, the MDT configuration is discarded and the conservation timer starts (step S1040). The UE removes the MDT configuration and no longer performs the MDT measurement. Although it is described herein that the validity timer is expired in the RRC idle mode, there is no limitation on an expiry time of the validity timer.

The UE establishes/re-establishes/reconfigures an RRC connection to a BS and enters the RRC connected mode (step S1050).

When the UE transitions from the RRC idle mode to the RRC connected mode, the UE sends a logging indicator to the network (step S1055). The logging indicator may be a 1-bit indicator indicating an availability of the logged measurement. The UE performs the MDT measurement in the idle mode, and reports to the network whether there is the logged measurement while entering the connected mode.

The UE may send the logging indicator to the network when the RRC connection is established, or when the RRC connection is re-established, or when the RRC connection is reconfigured. For example, when the RRC connection establishment procedure of FIG. 5 is performed, the logging indicator may be included in the RRC connection setup complete message. When the RRC connection re-establishment procedure of FIG. 6 is performed, the logging indicator may be included in the RRC connection re-establishment complete message.

When the network knows that there is the logged measurement on the basis of the logging indicator, the network sends to the UE an information request for requesting a report of the logged measurement (step S1060). The UE sends to the network an information response including the logged measurement (step S1070).

At the expiry of the conservation timer, the logged measurement is automatically discarded (step S1080).

Figure 11:
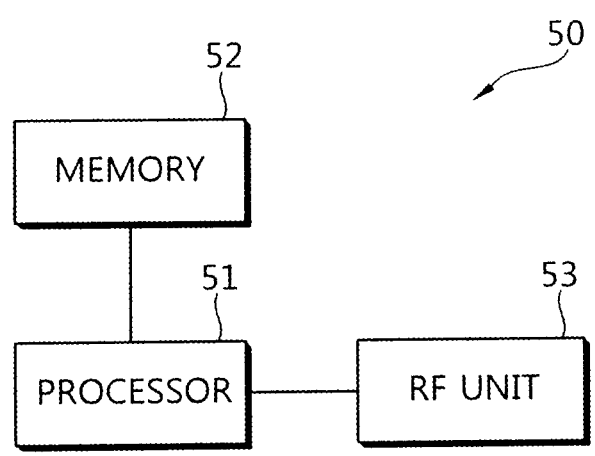
FIG. 11 is a block diagram showing a wireless apparatus for implementing an embodiment of the present invention.

FIG. 11 is a block diagram showing a wireless apparatus for implementing an embodiment of the present invention. This apparatus implements an operation of a UE described in the aforementioned embodiments of FIG. 9 and FIG. 10.

An apparatus 50 includes a processor 51, a memory 52, and a radio frequency (RF) unit 53. The processor 51 implements the proposed functions, processes, and/or methods. The processor 51 transitions between an RRC connected mode and an RRC idle mode, and measures a logged MDT on the basis of an MDT configuration. The memory 52 is coupled to the processor 51, and stores the MDT configuration and a logged measurement. The aforementioned embodiments of FIG. 0 and FIG. 10 can be implemented by the processor 51 and the memory 52.

The RF unit 53 is coupled to the processor 51, and transmits and receives a radio signal.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method of discarding logged measurements of a User Equipment (UE) in a wireless communication system, the method comprising:
receiving, by the UE, a first measurement configuration;
upon receiving the first measurement configuration, starting a timer based on a first value set by the first measurement configuration;
logging, by the UE in a Radio Resource Control (RRC) idle mode, measurements based on the first measurement configuration;
receiving, by the UE, a second measurement configuration; and
upon receiving the second measurement configuration, discarding the first measurement configuration and the logged measurements measured by the first measurement configuration.

2. The method of claim 1, further comprising: upon receiving the second measurement configuration, stopping the timer operated by the first value set.

3. The method of claim 1, further comprising: upon receiving the second measurement configuration, starting the timer based on a second value set by the second measurement configuration.

4. The method of claim 3, wherein the first value set and the second value set indicate logging durations.

5. The method of claim 1, further comprising: logging, by the UE in the RRC idle mode, measurements based on the second measurement configuration.

6. The method of claim 5, further comprising: upon an expiry of the timer operated by the second value set, discarding the second measurement configuration.

7. The method of claim 6, further comprising: discarding the logged measurements measured by the second measurement configuration after a certain time period from the expiry of the timer operated by the second value set.

8. The method of claim 7, wherein the certain time period is 48 hours.

9. The method of claim 1, further comprising: transmitting, by the UE to a network, a logging indicator indicating an availability of the logged measurements.

10. The method of claim 9, further comprising: receiving, by the UE from the network, an information request to request the logged measurements; and transmitting, by the UE to the network, an information response to send the logged measurements.

11. An apparatus of discarding logged measurements in a wireless communication system, the apparatus comprising:
a radio frequency unit for transmitting and receiving radio signals; and
a processor operatively coupled with the radio frequency unit and configured for:
receiving a first measurement configuration;
upon receiving the first measurement configuration, starting a timer based on a first value set by the first measurement configuration;
logging measurements based on the first measurement configuration;
receiving a second measurement configuration; and
upon receiving the second measurement configuration, discarding the first measurement configuration and the logged measurements measured by the first measurement configuration.

12. The apparatus of claim 11, wherein the processor is further configured for: upon receiving the second measurement configuration, stopping the timer operated by the first value set.

13. The apparatus of claim 11, wherein the processor is further configured for: upon receiving the second measurement configuration, starting the timer based on a second value set by the second measurement configuration.

14. The apparatus of claim 13, wherein the first value set and the second value set indicate logging durations.

15. The apparatus of claim 11, wherein the processor is further configured for: logging measurements based on the second measurement configuration.

16. The apparatus of claim 15, wherein the processor is further configured for: upon an expiry of the timer operated by the second value set, discarding the second measurement configuration.

17. The apparatus of claim 16, wherein the processor is further configured for: discarding the logged measurements measured by the second measurement configuration after a certain time period from the expiry of the timer operated by the second value set.

18. The apparatus of claim 17, wherein the certain time period is 48 hours.

19. The apparatus of claim 11, wherein the processor is further configured for: transmitting a logging indicator indicating an availability of the logged measurements.

20. The apparatus of claim 19, wherein the processor is further configured for: receiving an information request to request the logged measurements; and transmitting an information response to send the logged measurements.

* * * * *